(12) United States Patent
Matsuura et al.

(10) Patent No.: US 8,861,063 B2
(45) Date of Patent: Oct. 14, 2014

(54) LIGHT CONTROL APPARATUS

(71) Applicant: Furukawa Electric Co., Ltd., Tokyo (JP)

(72) Inventors: Hiroshi Matsuura, Tokyo (JP); Atsushi Oguri, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/871,546

(22) Filed: Apr. 26, 2013

(65) Prior Publication Data

US 2013/0235444 A1    Sep. 12, 2013

Related U.S. Application Data

(63) Continuation of application No. PCT/JP2011/074145, filed on Oct. 20, 2011.

(30) Foreign Application Priority Data

Oct. 26, 2010   (JP) .................................. 2010-240172

(51) Int. Cl.
    *G02F 1/03*       (2006.01)
    *G02F 1/01*       (2006.01)
    *G02F 1/13*       (2006.01)
    *G02F 1/061*      (2006.01)
    *G02F 1/31*       (2006.01)

(52) U.S. Cl.
    CPC ................ *G02F 1/0136* (2013.01); *G02F 1/13* (2013.01); *G02F 1/061* (2013.01); *G02F 1/31* (2013.01)
    USPC ........................................................ 359/246

(58) Field of Classification Search
    USPC .......................................................... 359/246
    See application file for complete search history.

(56) References Cited

U.S. PATENT DOCUMENTS

| 5,414,540 A | 5/1995 | Patel et al. |
| 5,414,541 A | 5/1995 | Patel et al. |

(Continued)

FOREIGN PATENT DOCUMENTS

| JP | 8-510564 | 11/1996 |
| JP | 2009-168840 | 7/2009 |
| JP | 2009-258438 | 11/2009 |

OTHER PUBLICATIONS

International Search Report issued on Nov. 15, 2011 for PCT/JP2011/074145 filed on Oct. 20, 2011 with English Translation.

(Continued)

*Primary Examiner* — James Jones
(74) *Attorney, Agent, or Firm* — Oblon, Spivak, McClelland, Maier & Neustadt, L.L.P.

(57) ABSTRACT

An optical control apparatus includes: an optical input/output port to which light is input from outside or from which light is output outside; a spatial optical modulator that emits light having entered from the optical input/output port towards the optical input/output port and has polarization dependence; a condensing element that is disposed between the optical input/output port and the spatial optical modulator and optically couples the optical input/output port and the spatial optical modulator; and a polarization control element that is disposed between the condensing element and the spatial optical modulator, controls a polarization state of input light to cause the input light to have only a single polarization direction, and outputs the input light controlled.

16 Claims, 6 Drawing Sheets

(56) References Cited

U.S. PATENT DOCUMENTS

| | | |
|---|---|---|
| 7,397,980 B2 * | 7/2008 | Frisken .......................... 385/24 |
| 7,787,720 B2 | 8/2010 | Frisken et al. |
| 2013/0108205 A1 | 5/2013 | Oguri et al. |

OTHER PUBLICATIONS

International Written Opinion issued on Nov. 15, 2011 for PCT/JP2011/074145 filed on Oct. 20, 2011.

* cited by examiner

LIGHT CONTROL APPARATUS

CROSS-REFERENCE TO RELATED APPLICATIONS

This application is a continuation of PCT International Application No. PCT/JP2011/074145 filed on Oct. 20, 2011, which claims the benefit of priority from the prior Japanese Patent Application No. 2010-240172 filed on Oct. 26, 2010. The entire contents of these applications are incorporated herein by reference.

BACKGROUND OF THE INVENTION

1. Field of the Disclosure

The disclosure relates to an optical control apparatus that controls intensities, wavelengths, phases, polarization states, paths, or the like of light.

2. Description of the Related Art

Modes of recent optical communication systems are developing from point-to-point type networks to ring type or mesh type networks. Nodes of networks of such modes require optical switch apparatuses, which are optical control apparatuses for inputting and outputting arbitrary signal light to and from arbitrary ports and arbitrarily changing paths of the signal light. Particularly, when wavelength multiplexing signal light obtained by wavelength division multiplexing of signal light beams having wavelengths different from one another is used, a wavelength selecting optical switch apparatus, which is able to arbitrarily change a path of signal light having an arbitrary wavelength, is required.

Such an optical switch apparatus uses liquid crystal on silicon (LCOS) to switch a path of signal light (see U.S. Patent Application Publication Nos. 2006/0067611 and 2005/0276537). LCOS is a spatial optical modulator that is able to modulate a phase of input light by liquid crystal and to diffract the light. In the optical switch apparatus using LCOS, optical switch operations are realized by diffracting signal light input from a certain path by LCOS and outputting the signal light to a specific path.

LCOS has polarization dependent characteristics because birefringence of liquid crystal is used. The optical switch apparatus using LCOS includes a polarization separation element and a polarization rotation element in order to solve this problem. Such an optical switch apparatus is configured such that a polarization separation element separates signal light input to the optical switch apparatus into two signal light beams of linear polarizations orthogonal to each other, and a polarization rotation element rotates a polarization direction of one of the signal beams to match a polarization direction of the other one of the signal light beams so that the two signal beams with their polarization directions coinciding are incident on LCOS. As a result, the problem of the polarization dependent characteristics is solved because the signal beams having only the single polarization direction are incident on LCOS.

SUMMARY

Technical Problem

As functionality of optical communication systems increases, the number of optical parts used in an optical communication apparatus constituting a system also increases. Therefore, due to limited space for installation of the apparatuses, downsizing of optical control apparatuses that control intensities, wavelengths, phases, polarization states, paths, or the like of light, including optical switch apparatuses, is strongly demanded.

Accordingly, there is a need to provide a more downsized optical control apparatus.

SUMMARY OF THE INVENTION

According to an embodiment of the present invention, an optical control apparatus includes: an optical input/output port to which light is input from outside or from which light is output outside; a spatial optical modulator that emits light having entered from the optical input/output port towards the optical input/output port and has polarization dependence; a condensing element that is disposed between the optical input/output port and the spatial optical modulator and optically couples the optical input/output port and the spatial optical modulator; and a polarization control element that is disposed between the condensing element and the spatial optical modulator, controls a polarization state of input light to cause the input light to have only a single polarization direction, and outputs the input light controlled.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE INVENTION

Figure 1:
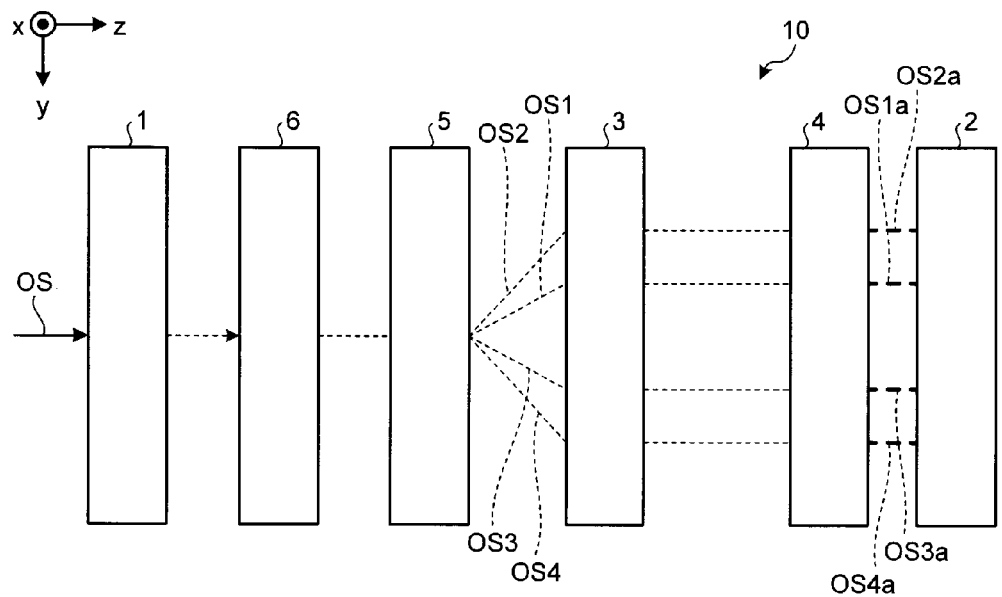
FIG. 1 is a block diagram illustrating a schematic configuration of a wavelength selecting optical switch apparatus according to a first embodiment.

An embodiment of an optical control apparatus according to the present invention is described in detail below with reference to the accompanying drawings. The embodiment does not limit the present invention. In the drawings, the same or corresponding components are labeled with the same reference numerals. Further, it is to be noted that the drawings are schematic and relations between thicknesses and widths of each layer and ratios among layers may differ from those of the actual. Furthermore, portions having relations and ratios of dimensions that differ among drawings may be included. In the drawings, directions are described using an x-y-z coordinate system as appropriate and x-axis, y-axis, and z-axis directions are the same among the drawings.

First Embodiment

Figure 2:
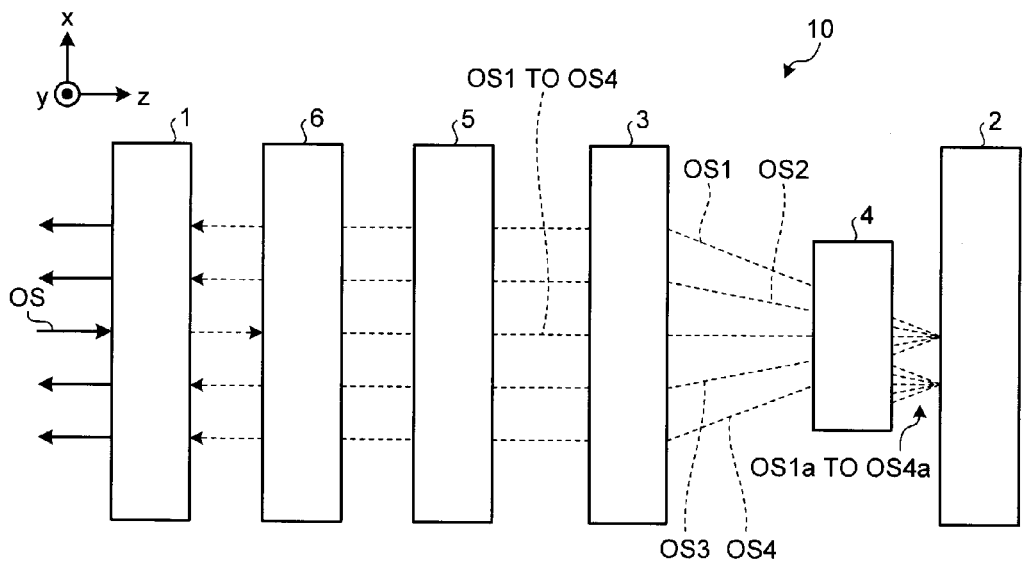
FIG. 2 is a diagram illustrating the wavelength selecting optical switch apparatus illustrated in FIG. 1 as viewed from another direction.

First, a wavelength selecting optical switch apparatus that is an optical control apparatus according to a first embodiment of the present invention is described. FIGS. 1 and 2 are block diagrams each illustrating a schematic configuration of a wavelength selecting optical switch apparatus 10 according to the first embodiment. FIG. 1 is an illustration as viewed from a positive direction of an x-axis direction in an x-y-z coordinate system while FIG. 2 is an illustration as viewed from a positive direction of a y-axis direction. As illustrated in FIG. 1, the wavelength selecting optical switch apparatus 10 includes a collimator array 1, a spatial optical modulator array 2 that is an optical switch, a condensing lens 3 that is a condensing element, a polarization control element 4, a diffraction grating 5 that is a light dispersion element, and an anamorphic optical system 6. Light input to or output from the wavelength selecting optical switch apparatus 10 is not particularly limited, but is, for example, signal light for optical communications having a wavelength of 1520 nm to 1620 nm. The spatial optical modulator array 2 may have four spatial modulators arranged in an array, or a single spatial modulator may be divided into four regions and each region may be independently controlled.

The condensing lens 3 is disposed between and optically connect the collimator array 1 and the spatial optical modulator array 2. The condensing lens 3 may be formed of a single lens or a plurality of lenses. The polarization control element 4 is disposed between the condensing lens 3 and the spatial optical modulator array 2 and controls a polarization state of input light. Specifically, the polarization control element 4 performs polarization separation and polarization rotation on input light, as described later. The diffraction grating 5 is a diffraction grating of a transmissive type, is disposed between the collimator array 1 and the condensing lens 3, and disperses input light. The anamorphic optical system 6 is disposed between the collimator array 1 and the diffraction grating 5 and changes an aspect ratio of a beam shape of input light.

Figure 3:
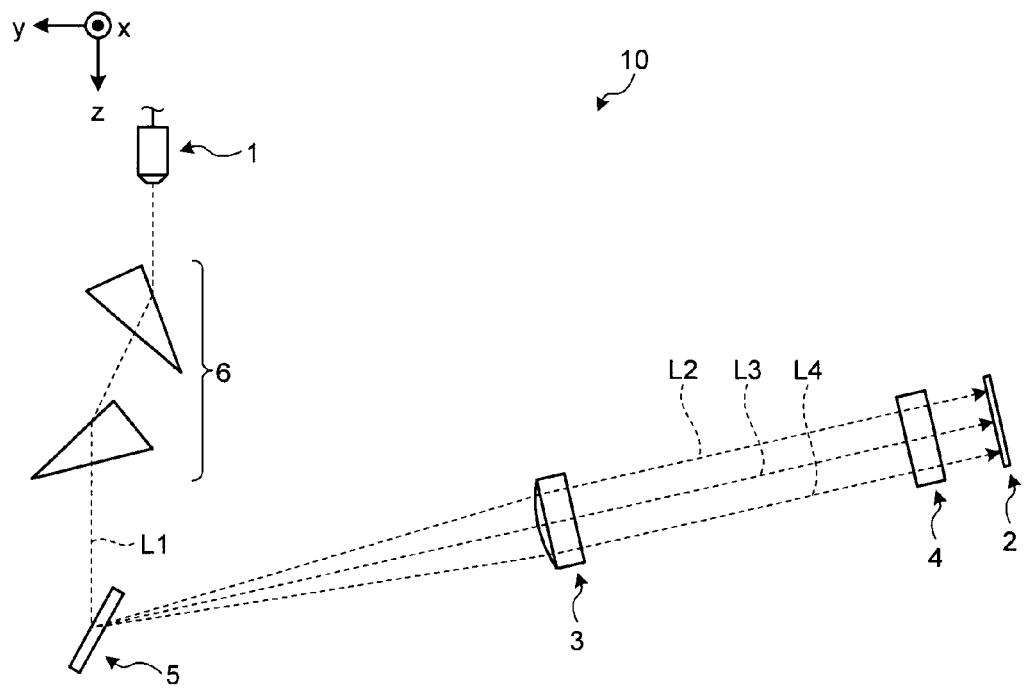
FIG. 3 is a diagram illustrating a layout of each element in the wavelength selecting optical switch apparatus illustrated in FIG. 1.

FIG. 3 is a diagram illustrating a layout of elements in the wavelength selecting optical switch apparatus 10 illustrated in FIG. 1. As illustrated, because an optical path is actually greatly bent at the diffraction grating 5, elements from the anamorphic optical system 6 to the spatial optical modulator array 2 are disposed at an angle about the diffraction grating 5. However, in FIGS. 1 and 2, the elements are illustrated as disposed in a straight line along an optical path for simplification. As illustrated in FIG. 3, an anamorphic prism pair may be used as the anamorphic optical system 6, but, for example, a combination of cylindrical lenses may be used instead. In FIG. 3, a state is illustrated, in which light L1 input from the collimator array 1 is dispersed by the diffraction grating 5 to light beams L2, L3, and L4 having different wavelengths. The diffraction grating 5 is disposed so as to disperse light in a yz plane.

Next, the collimator array 1, the polarization control element 4, and the spatial optical modulator array 2 are specifically described below in order.

Figure 4:
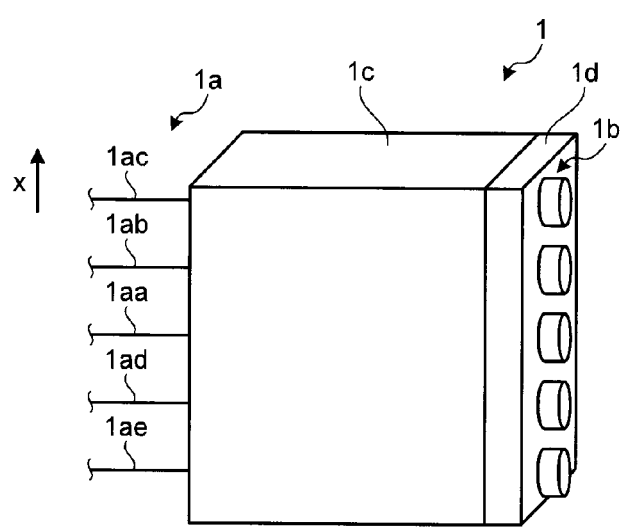
FIG. 4 is a diagram illustrating a configuration of a collimator array illustrated in FIG. 1.

FIG. 4 is a diagram illustrating a configuration of the collimator array 1 illustrated in FIG. 1. As illustrated in FIG. 4, the collimator array 1 includes an optical input/output port 1a to which light is input from outside or from which light is output outside, a plurality of collimator lenses 1b, an optical fiber fixing base 1c through which each optical fiber port of the optical input/output port 1a is inserted and fixed, and a transparent spacer 1d that is attached to the optical fiber fixing base 1c and holds the collimator lenses 1b.

The optical input/output port 1a includes optical fiber ports 1aa to 1ae arranged in an array in a predetermined arrangement direction (the x-axis direction in the figure). Each optical fiber port is fixed such that a light-emitting end face thereof and a surface of the optical fiber fixing base 1c to which the spacer 1d is attached are on the same plane. The collimator lenses 1b are provided correspondingly to the respective optical fiber ports 1aa to 1ae. The thickness of the spacer 1d is approximately equal to a focal length of the collimator lenses 1b. As a result, the collimator lenses 1b in the collimator array 1 are able to collimate light output from each optical fiber port, or condense and couple input collimated light to the optical fiber ports.

In the wavelength selecting optical switch apparatus 10, of the optical input/output port 1a, the optical fiber port 1aa disposed on an optical axis of the condensing lens 3 is set as a common optical fiber port (Com port) to which light is input from outside while the other four optical fiber ports 1ab to 1ae are set as optical fiber ports that output light outside. That is, the wavelength selecting optical switch apparatus 10 functions as a 1×4 optical switch.

Figure 5:
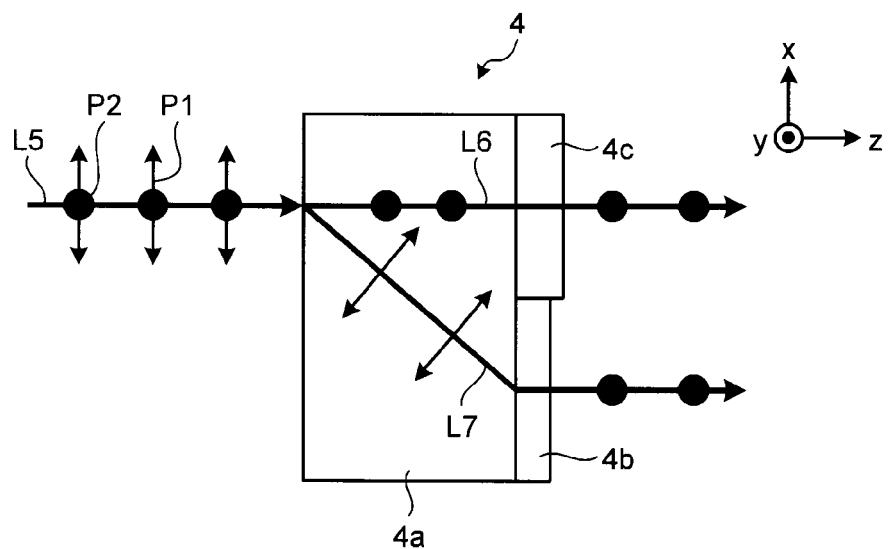
FIG. 5 is a schematic diagram illustrating a configuration of a polarization control element illustrated in FIG. 1.

Next, the polarization control element 4 is described below. FIG. 5 is a diagram illustrating a configuration of the polarization control element 4 illustrated in FIG. 1. As illustrated in FIG. 5, the polarization control element 4 includes a polarization separation element 4a, a polarization rotation element 4b disposed at a lower portion of a side surface of the polarization separation element 4a on the spatial optical modulator array 2 side (a right side in FIG. 5), and an optical path adjustment element 4c disposed at an upper portion of the side surface of the polarization separation element 4a on the spatial optical modulator array 2 side.

The polarization separation element 4a is made of a birefringent material such as rutile ($TiO_2$) single crystal or calcite for example, and polarizes and separates light L5 including two linear polarization components P1 (x-axis polarization) and P2 (y-axis polarization) orthogonal to each other into light L6 having the linear polarization component P1 and light L7 having the linear polarization component P2. The light L6 and light L7, which are emitted from the polarization separation element 4a, are separated in the arrangement direction of the optical input/output port 1a.

The polarization rotation element 4b, which is a half-wave plate, rotates the polarization direction of the input light L6 by 90 degrees to coincide with the polarization direction of the light L7 and outputs it.

The optical path adjustment element 4c, which is an optical plate (e.g., a glass plate), has a function of adjusting an optical path length of the light L7 input thereto. As illustrated in FIG. 5, in the polarization separation element 4a, the optical length of the light L7 is shorter than that of the light L6 that is polarized and rotated. Therefore, the optical path adjustment element 4c adjusts the optical path length of the light L7 by passing the light L7 therethrough so that the optical path length of the light L6 coincides with the optical path length of light L7. The optical path length of the light L7 is adjustable by setting a thickness and a refractive index of the optical path adjustment element 4c.

The polarization separation element 4a may be a Wollaston prism composed of prisms made of a birefringent material. In the polarization control element 4, the optical path adjustment element is disposed only on the optical path of the light L7, but may be disposed on each of the optical paths of the light L6 and light L7.

Figure 6:
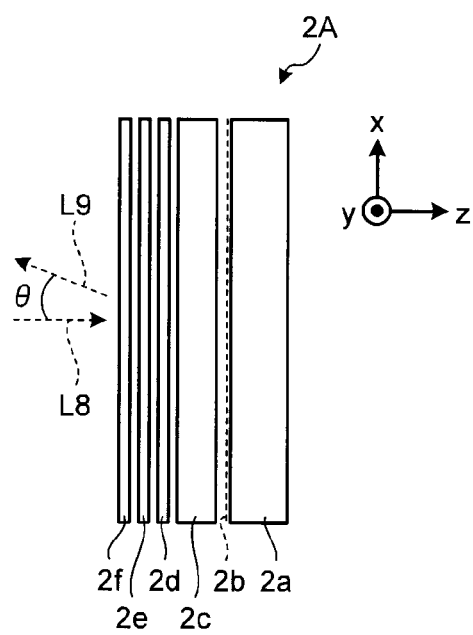
FIG. 6 is an exploded view illustrating a configuration of a spatial optical modulator included in a spatial optical modulator array illustrated in FIG. 1.

Next, the spatial optical modulator array 2 is described. The spatial optical modulator array 2 is composed of four spatial optical modulators arranged in an array in the y direction in FIG. 1. FIG. 6 is an exploded view illustrating a configuration of a spatial optical modulator 2A included in the spatial optical modulator array 2 illustrated in FIG. 1. As illustrated in FIG. 6, the spatial optical modulator 2A is LCOS and has a configuration including a silicon substrate 2a on which a liquid crystal drive circuit is formed; and a pixel electrode group 2b, which is a reflective layer having a reflectivity of approximately 100%, a liquid crystal layer 2c, which is a spatial optical modulation layer, an alignment film 2d, an indium tin oxide (ITO) electrode 2e, and a cover glass 2f, which are sequentially layered on the silicon substrate 2a.

The spatial optical modulator 2A is controllable such that the liquid crystal layer 2c has a refractive index gradation in the x-axis direction in the figure by applying a voltage between the pixel electrode group 2b and the ITO electrode 2e. By adjusting the refractive index gradation, light entering from the cover glass 2f side is adjustable to be diffracted at a predetermined diffraction angle and emitted, when reflected by the pixel electrode group 2b and propagated through the liquid crystal layer 2c.

Further, the spatial optical modulator 2A is disposed such that a direction of the refractive index gradation of the liquid crystal layer 2c coincides, in the x-axis direction, with the arrangement direction of the optical fiber ports 1aa to 1ae of the optical input/output port 1a. As a result, the spatial optical modulator 2A, by controlling a voltage applied to the liquid crystal layer 2c, is able to control an emission angle θ of light such that light L8 entering from the optical fiber port 1aa is emittable towards any of the other optical fiber ports 1ab to 1ae as light L9.

Each of the other three spatial optical modulators included in the spatial optical modulator array 2 has the same configuration as the spatial optical modulator 2A.

Operations of the wavelength selecting optical switch apparatus 10 is described below with reference to FIGS. 1 and 2. Wavelength multiplexing signal light OS including four signal light beams having different wavelengths from one another is input to a Com port (the optical fiber port 1aa of FIG. 4) of the collimator array 1 of the wavelength selecting optical switch apparatus 10. The collimator array 1 collimates the wavelength multiplexing signal light OS and outputs the collimated light to the anamorphic optical system 6. The anamorphic optical system 6 expands a beam diameter of the wavelength multiplexing signal light OS in an arrangement direction of a grating of the diffraction grating 5 and outputs it. As a result, the wavelength multiplexing signal light OS hits much of the grating, and thus resolution of wavelength selection is able to be increased. The diffraction grating 5 disperses the wavelength multiplexing signal light OS into signal light beams OS1, OS2, OS3, and OS4 having different wavelengths from one another, and outputs them at predetermined angles. The condensing lens 3 refracts the optical paths of the signal light beams OS1, OS2, OS3, and OS4 and condenses them to the spatial optical modulator array 2 via the polarization control element 4.

The polarization control element 4 performs control of polarizing and separating each of the signal light beams OS1, OS2, OS3, and OS4, and causing the polarization directions and the optical path lengths of the two separated light beams to coincide with each other, and outputs them, as described above. As a result, the signal light beams OS1, OS2, OS3, and OS4 are respectively condensed to the spatial optical modulator array 2 as signal light beams OS1a to OS4a that have been subjected to the above control. The signal light beam OS1a to OS4a are condensed to the respective four spatial optical modulators included in the spatial optical modulator array 2.

An incident angle of each of the signal light beams OS1 to OS4 on the polarization control element 4 is not zero degree and differs from one another, and is generally designed to be a small angle. Therefore, polarization control characteristics of the polarization control element 4 on the signal light beams OS1 to OS4 are almost the same regardless of the differences in their incident angles.

A voltage applied to the spatial optical modulator array 2 is controlled by a controller not illustrated and the spatial optical modulator array 2 diffracts each of the signal light beams OS1a to OS4a at a predetermined angle towards a corresponding port of the optical fiber ports 1ab to 1ae. The spatial optical modulator array 2 has polarization dependence, but the signal light beams OS1a to OS4a are diffracted without being influenced by the polarization dependence of the spatial optical modulator array 2 because the signal light beams OS1a to OS4a have been caused to have the single polarization direction by being controlled by the polarization control element 4.

Next, the signal light beams OS1a to OS4a are input to the polarization control element 4 again. The polarization control element 4 performs control reverse to the outward route on the signal light beams OS1a to OS4a. That is, the polarization control element 4 causes the two light beams having coinciding polarization directions to be orthogonal to each other and combine them, and outputs them as the signal light beams OS1 to OS4.

The signal light beams OS1 to OS4, sequentially via the condensing lens 3, the diffraction grating 5, and the anamorphic optical system 6, enter the corresponding optical fiber ports 1ab to 1ae of the collimator array 1, and are output from the wavelength selecting optical switch apparatus 10. As described, the wavelength selecting optical switch apparatus 10 is able to perform wavelength selecting optical switching operations of outputting the wavelength multiplexing signal light OS input from the Com port to a desired port for each of the signal light beams OS1 to OS4 of respective wavelengths.

The wavelength selecting optical switch apparatus 10 is more downsized than the conventional one because the polarization control element 4 is disposed between the condensing lens 3 and the spatial optical modulator array 2.

Description is made below in comparison to a conventional wavelength selecting optical switch apparatus. In the conventional wavelength selecting optical switch apparatus, a polarization control element performing polarization separation is disposed directly behind an optical input/output port. Therefore, an optical element, which is disposed behind the polarization control element, needs to have a size for reserving optical paths of light beams of two polarization states.

Figure 7:
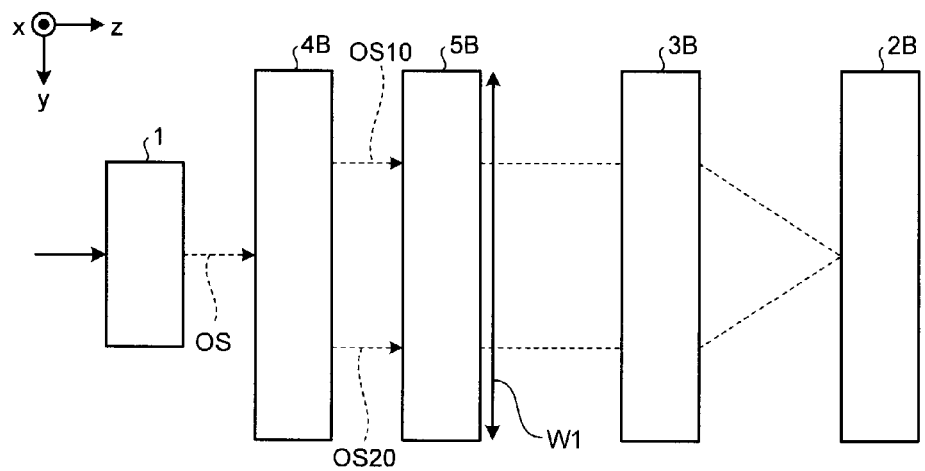
FIG. 7 is a diagram illustrating optical paths of signal light in a diffraction grating of a conventional wavelength selecting optical switch apparatus.

For example, FIG. 7 is a diagram illustrating optical paths of wavelength multiplexing signal light OS in a diffraction grating 5B of the conventional wavelength selecting optical switch apparatus. An anamorphic optical system 6 may be disposed behind a collimator array 1 as necessary, for example. As illustrated in FIG. 7, in the conventional wavelength selecting optical switch apparatus, in which the collimator array 1, a polarization control element 4B, a diffraction grating 5B, a condensing lens 3B, and a spatial optical modulator array 2B are arranged in this order, the wavelength multiplexing signal light OS is input to the diffraction grating 5B in a state of being separated by the polarization control element 4B into two signal light beams OS10 and OS20 each having linear polarization. Therefore, the diffraction grating 5B having a width W for reserving two optical paths of the signal light beams OS10 and OS20 needs to be used. Specifically, a width twice or more of the beam diameters of the signal light beams OS10 and OS20 is required.

Figure 8:
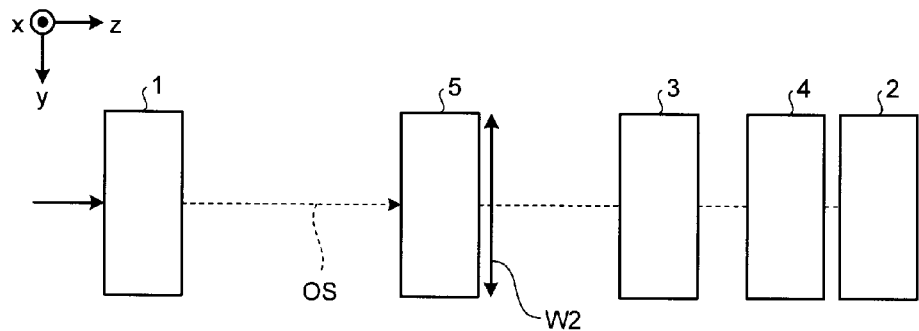
FIG. 8 is a diagram illustrating an optical path of signal light in a diffraction grating of the wavelength selecting optical switch apparatus illustrated in FIG. 1.

In contrast, FIG. 8 is a diagram illustrating an optical path of the wavelength multiplexing signal light OS in the diffraction grating 5 of the wavelength selecting optical switch apparatus 10 according to the first embodiment illustrated in FIG. 1. The anamorphic optical system 6 is not illustrated in FIG. 8. As illustrated in FIG. 8, in the wavelength selecting optical switch apparatus 10, the wavelength multiplexing signal light OS is input to the diffraction grating 5 without being polarized and separated. As a result, because only one optical path for the wavelength multiplexing signal light OS needs to be reserved, a width W2 of the diffraction grating 5 may be smaller than the width W1 of the conventional diffraction grating 5a. For example, the width W2 may be equal to or less than half of the width W1. Consequently, in the wavelength selecting optical switch apparatus 10, a diffraction grating more downsized than the conventional diffraction grating 5B is usable as the diffraction grating 5.

Figure 9:
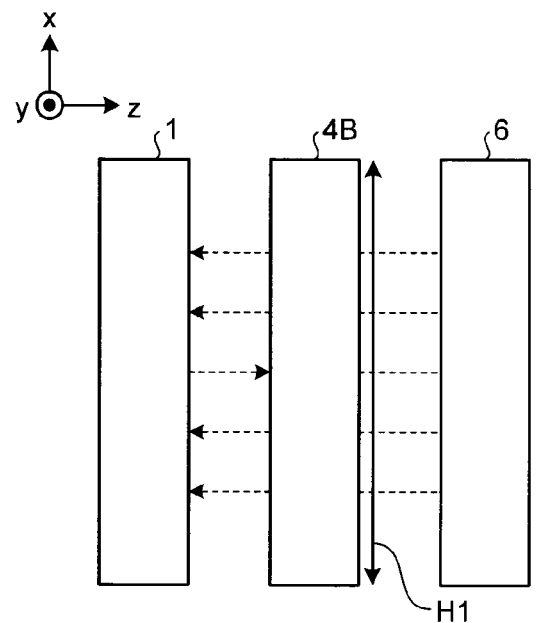
FIG. 9 is a diagram illustrating optical paths of signal light in a polarization control element of the conventional wavelength selecting optical switch apparatus.

FIG. 9 is a diagram illustrating optical paths of signal light in the polarization control element 4B of the conventional wavelength selecting optical switch apparatus. The polarization control element 4B needs to have a height H1 for passing therethrough all of the signal light beams, which are indicated by the broken lines and are input to and output from the collimator array 1, because the polarization control element 4B is disposed directly behind the collimator array 1 in the conventional wavelength selecting optical switch apparatus as illustrated in FIG. 9.

Figure 10:
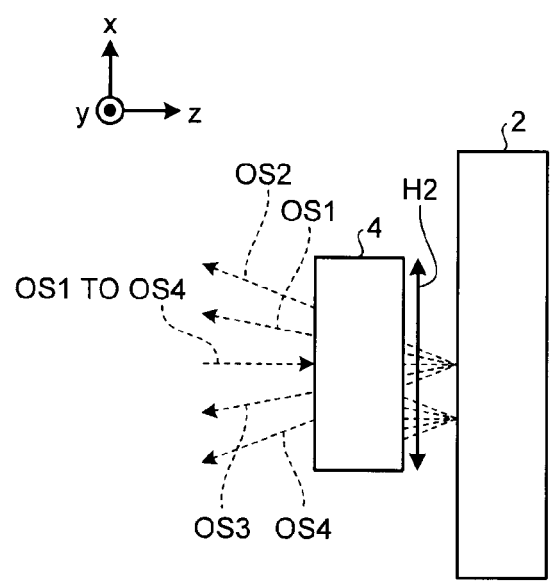
FIG. 10 is a diagram illustrating optical paths of signal light in the polarization control element of the wavelength selecting optical switch apparatus illustrated in FIG. 1.

In contrast, FIG. 10 is a diagram illustrating optical paths of signal light in the polarization control element 4 of the wavelength selecting optical switch apparatus 10 according to the first embodiment illustrated in FIG. 1. As illustrated in FIG. 10, in the wavelength selecting optical switch apparatus 10, the signal light beams OS1 to OS4 pass through the polarization control element 4 in a state in which the optical paths are closely spaced after being refracted by the condensing lens 3. Therefore, a height H2 of the polarization control element 4 is smaller than the height H1 of the conventional polarization control element 4B. Consequently, a polarization control element more downsized than the conventional polarization control element 4B is usable as the polarization control element 4.

Similarly, the anamorphic optical system 6 and the condensing lens 3 more downsized than the conventional ones are usable in the wavelength selecting optical switch apparatus 10 according to the first embodiment. Consequently, the wavelength selecting optical switch apparatus 10 is able to be much more downsized than the conventional one because the optical elements to be used are able to be downsized.

When the polarization separation is performed before the condensing lens 3, light is condensed using a portion away from the optical axis in the condensing lens 3, and thus there is problem that influence by aberration of the condensing lens 3 becomes greater. As a result, beams are not entirely condensed in the spatial optical modulator array 2, and characteristics of the wavelength selecting optical switch apparatus are degraded.

Further, in the conventional wavelength selecting optical switch apparatus, the signal light beams of the two polarization states that have been polarized and separated propagate a long distance and pass a plurality of optical elements until they arrive at the spatial optical modulator array. The optical paths of the signal light beams of the two polarization states are spatially separated and thus a difference in the optical path lengths may be generated every time an optical element is passed through. As a result, in the conventional wavelength selecting optical switch apparatus, optical path adjustment and layout design of the optical elements for making the optical paths of the signal light beams of the two polarization states equal to each other have been complicated.

Particularly, when an optical path is greatly bent around a diffraction grating as illustrated in FIG. 3, an optical path from a polarization control element to a diffraction grating and an optical path from a diffraction grating to a spatial optical modulator array are preferably independently adjusted. In this case, however, the optical path adjustment elements need to be disposed at at least two positions and thus the layout design of the optical path adjustment elements become cumbersome and the number of parts is increased, thereby increasing the cost.

In contrast, in the wavelength selecting optical switch apparatus 10 according to the first embodiment, the two signal light beams polarized and separated by the polarization control element 4 have a short distance to reach the spatial optical modulator array 2 and do not pass through other optical elements. In addition, the optical path length does not need to be adjusted before the diffraction grating 5. Consequently, the wavelength selecting optical switch apparatus 10 allows the optical path adjustment and the layout design of the optical elements to be more readily performed than the conventional one, thereby achieving low cost.

When a configuration to widen a beam diameter in a certain direction using an anamorphic optical system is employed and polarization and separation are performed before the anamorphic optical system, optical elements disposed after the anamorphic optical system need to be particularly large-sized for reserving optical paths. In contrast, in the wavelength selecting optical switch apparatus 10 according to the first embodiment, while employing the anamorphic optical system 6, because each optical element is able to be downsized, further greater downsizing is possible and this is particularly preferable.

Figure 11:
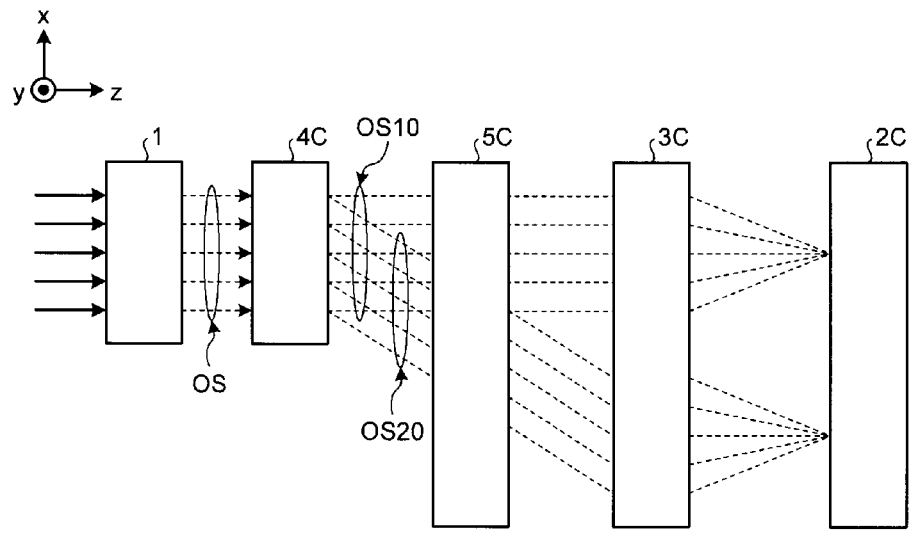
FIG. 11 is a diagram illustrating optical paths of another conventional wavelength selecting optical switch apparatus, which differs from that illustrated in FIG. 7, as viewed from a positive direction of a y-axis direction.
Figure 12:
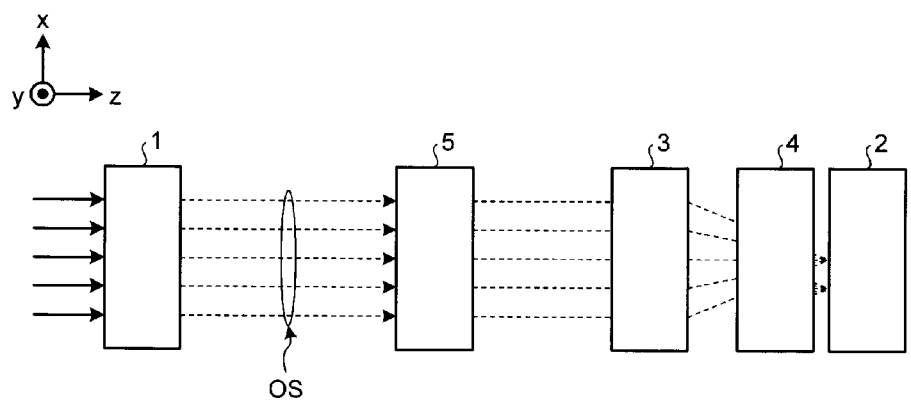
FIG. 12 is a diagram illustrating optical paths of the wavelength selecting optical switch apparatus 10 according to the first embodiment as viewed from the positive direction of the y-axis direction.

For example, FIG. 11 is a diagram illustrating optical paths of another conventional wavelength selecting optical switch apparatus, which differs from that of FIG. 7, as viewed from the positive direction of the y-axis direction. An anamorphic optical system 6 may be disposed behind the collimator array 1, for example, as necessary. FIG. 12 is a diagram illustrating optical paths of the wavelength selecting optical switch apparatus 10 according to the first embodiment as viewed from the positive direction of the y-axis direction. The anamorphic optical system 6 is not illustrated in FIG. 12. As illustrated in FIG. 11, in the conventional wavelength selecting optical switch apparatus, wavelength multiplexing signal light beams OS enter a diffraction grating 5C, a condensing lens 3C, and then a spatial optical modulator array 2C in a state in which two signal light beams OS10 and OS20 each having linear polarization are separated in the x-axis direction by a polarization control element 4C. As a result, a height of the conventional wavelength selecting optical switch apparatus needs to be twice or more of the wavelength selecting optical switch apparatus 10 of the first embodiment as illustrated in FIG. 12 to reserve two optical paths of the signal light beams OS10 and OS20. The wavelength selecting optical switch apparatus 10 of the first embodiment has a feature of leading to downsizing because of the ability to decrease the height, and a feature of leading to lowering of cost because of having to use only small optical parts. In addition, in the wavelength selecting optical switch apparatus 10 of the first embodiment, the optical path length is readily adjusted because signal light is not separated into two signal light beams having linear polarization before the spatial optical modulator array 2.

In the above-described embodiment, the optical switch apparatus is of the 1×4 type, but in the present invention, the number of ports to which light is input and from which light is output is not particularly limited and it may be any N×M optical switch apparatus (where N and M are integers of 1 or greater).

Further, in the embodiment, the spatial optical modulator is LCOS, but it is not particularly limited thereto as long as it is any spatial optical modulator or optical switch that uses liquid crystal or another material capable of switching light as the spatial optical modulation layer and has polarization dependence.

Further, in the embodiment, the diffraction grating is of the transmissive type, but it may be of a reflective type. An optical dispersion element such as a prism may be used instead of the diffraction grating. The light dispersion element preferably has comparatively small polarization dependence.

Further, the embodiment is the wavelength selecting optical switch apparatus, but the present invention is not limited thereto, and may be applied to an optical switch apparatus that does not have an optical dispersion element and arbitrarily changes a path of signal light having a particular wavelength. The present invention may also be applied to an optical switch apparatus that does not have an anamorphic optical system.

Further, in the embodiment, the wavelength selecting optical switch apparatus using the optical switch is described, but the present invention is not limited thereto as long as it is any optical control apparatus using a spatial optical modulator having polarization dependence. For example, when an intensity modulator is used as the spatial optical modulator instead of the optical switch in the embodiment, it may be used as an intensity modulation apparatus. Furthermore, by arranging the intensity modulators along the y-axis direction in FIG. 1, which is the dispersion direction by the diffraction grating, intensity of light is controllable for each light beam of a wavelength incident on each intensity modulator, and thus an intensity spectrum shape of returned light is controllable. Moreover, if, for example, a phase modulator is used as the spatial optical modulator instead of the optical switch, it may be used as a phase modulation apparatus. In addition, by arranging the phase modulators along the y-axis direction in FIG. 1, which is the dispersion direction by the diffraction grating, a phase of light is controllable for each light beam of a wavelength incident on each phase modulator, and thus wavelength dependence of a group velocity dispersion of returned light is controllable. Controlling the wavelength dependence of the group velocity dispersion enables the phase modulation apparatus to have a function of dispersion compensation of signal light, for example. In such spatial optical modulation, light that has been controlled is not necessarily output to a port different from a port to which the light has been input, and may be returned to the same port to which the light has been input. In this case, input light and output light may be separated using a circulator or the like.

According to an embodiment of the disclosure, downsizing of optical elements to be used is achievable by disposing a polarization separation element between a condensing element and a spatial optical modulator, and thus an optical control apparatus is able to be downsized more.

The above-described embodiment does not limit the present invention. Any configuration obtained by combining the above-described elements as appropriate is also included in the present invention. Further effects and modified examples can be readily made by persons skilled in the art. Therefore, further aspects of the present invention are not limited to the above-described embodiment and various changes of the embodiment may be made.

What is claimed is:

1. An optical control apparatus, comprising:
an optical input/output port including a plurality of optical fiber ports arranged in an array to which light is input from outside or from which light is output outside;
a spatial optical modulator that emits light having entered from the optical input/output port towards the optical input/output port and has polarization dependence;
a condensing element that is disposed between the optical input/output port and the spatial optical modulator and optically couples the optical input/output port and the spatial optical modulator; and
a polarization control element that is disposed between the condensing element and the spatial optical modulator, controls a polarization state of input light to cause the input light to have only a single polarization direction, and outputs the input light controlled, wherein
the condensing element condenses the lights from the plurality of optical fiber ports to the spatial optical modulator via the polarization control element.

2. The optical control apparatus according to claim 1, wherein the polarization control element includes:
a polarization separation element that separates light entering from the optical input/output port into two light beams having linear polarizations orthogonal to each other; and
a polarization rotation element that is disposed on the polarization separation element at a spatial optical modulator side, and makes an output after causing polarization directions of the two light beams to coincide.

3. The optical control apparatus according to claim 1, wherein the spatial optical modulator spatially modulates light by liquid crystal.

4. The optical control apparatus according to claim 3, wherein the spatial optical modulator is LCOS.

5. The optical control apparatus according to claim 2, wherein the polarization separation element is made of a birefringent material.

6. The optical control apparatus according to claim 3, wherein the polarization control element includes a polarization separation element made of a birefringent material.

7. The optical control apparatus according to claim 5, wherein the polarization separation element is made of calcite or rutile.

8. The optical control apparatus according to claim 6, wherein the polarization separation element is made of calcite or rutile.

9. The optical control apparatus according to claim 5, wherein the polarization separation element is a Wollaston prism.

10. The optical control apparatus according to claim 6, wherein the polarization separation element is a Wollaston prism.

11. The optical control apparatus according to claim 1, further comprising an optical dispersion element that is disposed between the optical input/output port and the condensing element and separates wavelength components of input light, wherein the optical control apparatus controls, using the spatial optical modulator, a plurality of wavelength components separated by the optical dispersion element.

12. The optical control apparatus according to claim 11, wherein the light dispersion element is a diffraction grating.

13. The optical control apparatus according to claim 11, further comprising an anamorphic optical system disposed between the optical input/output port and the light dispersion element.

14. The optical control apparatus according to claim 1, wherein the spatial optical modulator is an optical switch.

15. The optical control apparatus according to claim 1, wherein the spatial optical modulator is an intensity modulator.

16. The optical control apparatus according to claim 1, wherein the spatial optical modulator is a phase modulator.

* * * * *